United States Patent
Sutardja et al.

(10) Patent No.: US 8,022,646 B1
(45) Date of Patent: Sep. 20, 2011

(54) METHOD AND APPARATUS FOR SPINDLE MOTOR CONTROL

(75) Inventors: Pantas Sutardja, Los Gatos, CA (US); Jerry Richgels, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/494,868

(22) Filed: Jun. 30, 2009

Related U.S. Application Data (63) Continuation of application No. 12/098,008, filed on Apr. 4, 2008, now Pat. No. 7,573,214, which is a continuation of application No. 10/752,601, filed on Jan. 6, 2004, now Pat. No. 7,378,810.

(60) Provisional application No. 60/471,800, filed on May 20, 2003.

(51) Int. Cl.
*H02P 21/00* (2006.01)

(52) U.S. Cl. .............. 318/268; 318/400.01; 318/400.14; 318/400.34; 318/603; 700/1; 700/13; 700/14; 700/33; 700/69; 360/260; 360/97.01; 360/75; 360/70; 360/73.01; 369/47.1; 369/47.4; 323/212; 323/234; 323/235; 323/237; 323/241

(58) Field of Classification Search .................. 318/601, 318/604, 400.14, 603, 561, 400.34, 703, 318/715, 453, 459; 700/1, 13, 14, 33, 69, 700/70, 78; 360/260, 97.01, 75, 70, 73.01; 369/47.1, 47.4, 39, 47.71; 323/212, 234, 323/235, 237, 241, 243, 246

See application file for complete search history.

(56) References Cited

U.S. PATENT DOCUMENTS

| | | | | |
|---|---|---|---|---|
| 5,631,999 A | * | 5/1997 | Dinsmore | 388/805 |
| 5,687,036 A | | 11/1997 | Kassab | |
| 5,808,440 A | * | 9/1998 | Bennett et al. | 318/778 |
| 5,818,179 A | | 10/1998 | Kokami et al. | |
| 5,869,946 A | | 2/1999 | Carobolante | |
| 5,982,130 A | | 11/1999 | Male | |
| 6,078,158 A | | 6/2000 | Heeren et al. | |
| 6,084,364 A | | 7/2000 | Menegoli | |
| 6,163,118 A | | 12/2000 | Chen et al. | |
| 6,163,120 A | | 12/2000 | Menegoli | |
| 6,369,534 B1 | * | 4/2002 | Menegoli | 318/400.35 |
| 6,476,996 B1 | | 11/2002 | Ryan | |
| 6,493,169 B1 | | 12/2002 | Ferris et al. | |
| 6,498,446 B1 | | 12/2002 | Menegoli et al. | |
| 6,563,666 B1 | | 5/2003 | LaPanse | |
| 6,566,832 B2 | | 5/2003 | Ataee | |
| 6,577,088 B2 | * | 6/2003 | Heydt et al. | 318/400.34 |
| 6,650,082 B1 | | 11/2003 | Du | |
| 6,754,025 B1 | * | 6/2004 | Shepherd et al. | 360/73.03 |
| 6,754,151 B2 | | 6/2004 | Watt | |
| 2002/0136127 A1 | | 9/2002 | Watt | |

OTHER PUBLICATIONS

Office action dated Oct. 31, 2006 from related case U.S. Appl. No. 10/752,601.

(Continued)

*Primary Examiner* — Rita Leykin (57) ABSTRACT

Information indicative of the placement of spindle motor components may be obtained and used to provide a correction to one or more BEMF-derived attributes used to control the spindle speed. In some implementations, first and second signals indicative of BEMF of different stator windings may be used to determine a speed-related characteristic. The speed related characteristic may be used to determine an error amount, which may be used to determine a correction factor to control the speed of the spindle motor.

20 Claims, 5 Drawing Sheets

OTHER PUBLICATIONS

Office action dated Apr. 19, 2007 from related case U.S. Appl. No. 10/752,601.
Supplemental office action dated Apr. 27, 2007 from related case U.S. Appl. No. 10/752,601.
Office action dated Jul. 2, 2007 from related case U.S. Appl. No. 10/752,601.
Office action dated May 3, 2006 from related case U.S. Appl. No. 10/830,861.
Office action dated Jan. 24, 2007 from related case U.S. Appl. No. 10/830,861.
Office action dated Nov. 13, 2008 from related case U.S. Appl. No. 12/098,008.

* cited by examiner

METHOD AND APPARATUS FOR SPINDLE MOTOR CONTROL

CROSS-REFERENCE TO RELATED APPLICATIONS

This application is a continuation application of U.S. application Ser. No. 12/098,008, filed Apr. 4, 2008, which is a continuation application of U.S. application Ser. No. 10/752,601, filed Jan. 6, 2004, which claims the benefit of U.S. Provisional Application No. 60/471,800, filed May 20, 2003.

TECHNICAL FIELD

This invention relates to motor control in a data storage system.

BACKGROUND

Some data storage systems, such as disc drive systems, use a motor to change the position of storage regions with respect to a mechanism to read and/or write to the storage regions.

For example, a disc drive data storage system typically includes one or more discs that store information using a magnetic medium. A spindle motor rotates the discs, and one or more read/write heads read information from and write information to memory regions on the discs.

Figure 1:
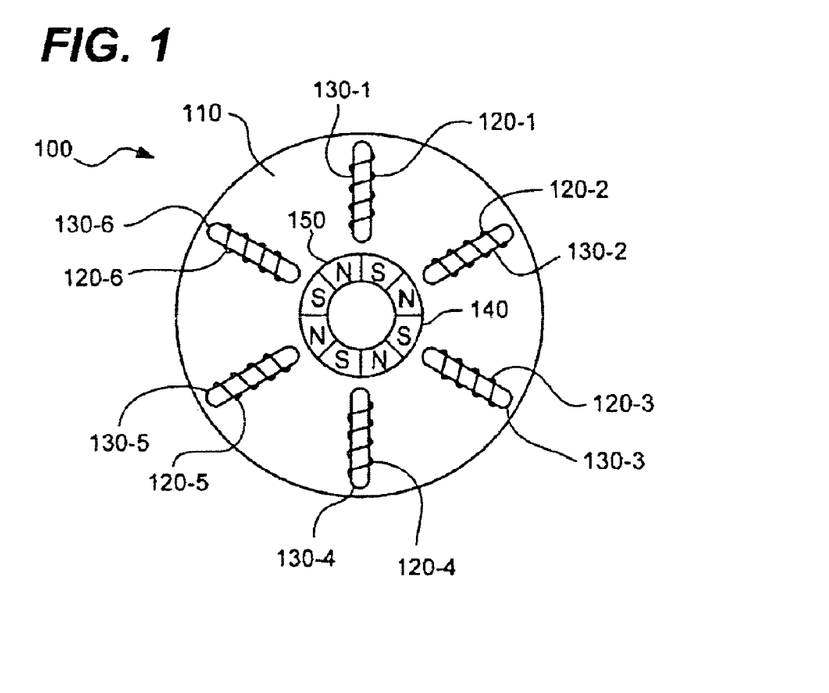
FIG. 1 is a schematic of a spindle motor, according to the prior art.

In order to accurately position a head with respect to a storage region on a disc, variations in the rotational speed of the disc need to stay within acceptable limits. FIG. 1 shows a spindle motor system 100 with a stator 110 having stator windings 120-1 to 120-6 around six radially distributed stator poles 130-1 to 130-6. A rotor 140 includes a number of permanent magnets 150 each with poles 150-N and 150-S. Current flow through different ones of the stator windings 120-1 to 120-6 generates electromagnetic fields, which interact with the fields generated by the permanent magnets 150. Torque generated by this electromagnetic interaction causes rotor 140 to rotate with respect to stator 110.

Once spindle motor 100 has been accelerated to operational speed, a spindle motor control system is used to maintain the operational speed. During each rotation of the spindle motor, some energy is dissipated (e.g., as heat due to friction). Therefore, windings 120-1 through 120-6 need to be energized to provide the required torque to maintain the desired rotational speed.

As noted above, energy is provided to motor 100 by applying voltages of appropriate duration to the windings 120-1 to 120-6 at appropriate times. For example, at a particular time $t_0$, current may be generated in winding 120-1 by applying a positive voltage (e.g., +5 volts) to winding 120-1. Also at $t_0$, current may be generated in winding 120-3 to flow in the opposite direction in winding 120-3 by applying a ground or negative voltage to winding 120-3. Winding 120-2 may not be energized at time $t_0$. However, as the permanent magnets 150 of rotor 140 rotate with respect to winding 120-2, the changing magnetic flux generates a back electromotive force (BEMF), which induces current flow in winding 120-2. The induced current may be detected and used in a feedback system to maintain the desired rotational speed.

In existing disc drive systems, the BEMF generated in a single winding is typically used to provide feedback for the spindle motor speed control system. A measured revolution time $\tau_{Meas}$ is determined by monitoring the BEMF signal in the winding for a complete revolution of the rotor. $\tau_{Meas}$ is compared to a reference time $\tau_{Ref}$, where $\tau_{Ref}$ is the revolution time corresponding to the desired speed. The feedback system generates current in the windings to produce the necessary torque based on the difference between $\tau_{Meas}$ and $\tau_{Ref}$.

SUMMARY

In general, in one aspect, a method for spindle motor control comprises receiving a first signal indicative of a back electromotive force (BEMF) induced in a first stator winding and a second signal indicative of a BEMF induced in a second different stator winding. The method may further include determining a speed-related characteristic based on at least one of the first signal and the second signal, and determining an error amount based on the speed-related characteristic. The method may further include determining a correction factor for the speed-related characteristic based on the error amount, and controlling a speed of the spindle motor using the correction factor.

In some implementations, the speed-related characteristic may be a measured time difference between a characteristic of the first signal and a corresponding characteristic of the second signal. The characteristic of the first signal may be, for example, a zero crossing of the first signal corresponding to a rotational state of a rotor. The characteristic of the second signal may be a zero crossing of the second signal corresponding to the rotational state of the rotor.

Determining the error amount may comprise determining a difference between the measured time difference and a reference time difference. The reference time difference may correspond to a desired rotational speed of the spindle motor.

The method may further include determining one or more additional error amounts and determining the correction factor based on at least one of the error amount and the additional error amounts. For example, the correction factors may be determined based on an average of the error amount and one or more additional error amounts. The method may include filtering the error amount and the additional error amounts to produce filtered error amount data.

In general, in another aspect, a computer program may be operable to cause one or more machines to perform operations including receiving a first signal indicative of a back electromotive force (BEMF) induced in a first stator winding and a second signal indicative of a BEMF induced in a second different stator winding. The operations may further include determining a speed-related characteristic based on at least one of the first signal and the second signal, and determining an error amount based on the speed-related characteristic. The operations may further include determining a correction factor for the speed-related characteristic based on the error amount, and controlling a speed of the spindle motor using the correction factor.

In general, in another aspect, a spindle motor controller includes one or more inputs configured to receive signals from a spindle motor. The signals may include a first signal indicative of a BEMF induced in a first stator and a second signal indicative of a BEMF induced in a second stator. The controller may further include a processor to determine a speed-related characteristic based on at least one of the first signal and the second signal, to determine an error amount based on the speed-related characteristic, to determine a correction factor for the speed-related characteristic based on the error amount, and to generate an output signal using the correction factor, the output signal to control the speed of the spindle motor.

In general, in another aspect, a spindle motor controller may include input means for receiving signals from a spindle motor, the signals including a first signal indicative of a back electromotive force (BEMF) induced in a first stator winding and a second signal indicative of a BEMF induced in a second different stator winding. The controller may further include means for determining a speed-related characteristic based on at least one of the first signal and the second signal, means for determining an error amount based on the speed-related characteristic, means for determining a correction factor for the speed-related characteristic based on the error amount, and means for generating an output signal using the correction factor, the output signal for controlling the speed of the spindle motor.

In general, in another aspect, a disc drive includes a disc having a storage surface. The disc drive may further include a spindle motor in communication with the disc, and a spindle motor controller to control the spindle motor to rotate the disc. The spindle motor controller may include one or more inputs configured to receive signals from a spindle motor, the signals including a first signal indicative of a back electromotive force (BEMF) induced in a first stator winding and a second signal indicative of a BEMF induced in a second stator winding.

The controller may further include a processor to determine a speed-related characteristic based on at least one of the first signal and the second signal, the processor to further determine an error amount based on the speed-related characteristic, the processor further to determine a correction factor for the speed-related characteristic based on the error amount.

In general, in another aspect, a disc drive may include disc means for storing data, the disc means having a storage surface. The disc drive may include means for rotating the disc means in communication with the disc means, and means for controlling the means for rotating.

The means for controlling may include input means for receiving signals from a spindle motor, the signals including a first signal indicative of a back electromotive force (BEMF) induced in a first stator winding and a second signal indicative of a BEMF induced in a second different stator winding. The means for controlling may further include means for determining a speed-related characteristic based on at least one of the first signal and the second signal, means for determining an error amount based on the speed-related characteristic, means for determining a correction factor for the speed-related characteristic based on the error amount, and means for generating an output signal using the correction factor, the output signal for controlling the speed of the spindle motor.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

The spindle motor systems and associated control methods described above may allow the speed to be maintained within acceptable limits in some systems, but may lead to unacceptable speed variations in others. For example, the method may provide sufficient speed control in large form factor disc drives (e.g., 3.5" and 2.5" drives) but not smaller form factor drives (e.g., 1" and 0.35" drives). Smaller form factor drives have smaller moments of inertia, and thus smaller angular momenta for comparable rotational speeds. Energy losses in smaller form factor drives may thus cause unacceptable speed changes over the course of a single rotation of the rotor.

The method may be altered so that rather than looking at the BEMF generated in a single winding, the BEMF generated in more than one winding may be used to determine the rotational speed. For example, for a motor with six poles (as shown in FIG. 1), the BEMF generated in each of the windings may be monitored. Speed information is thus obtained six times rather than once during a particular rotation of the rotor.

This method may lead to unacceptable results as well. Typical manufacturing processes used to produce the stator assemblies may introduce asymmetry in the assemblies. As a result, the poles may not be precisely spaced in the motor (e.g., for a motor with six poles, the angular spacing of the poles may be different than the desired value of $\pi/3$). Although such an asymmetry may not unduly affect motor operation in a spindle control system where BEMF is monitored in a single pole to determine the rotational speed of the rotor, it may introduce unacceptable inaccuracy when BEMF is monitored in multiple windings over the course of a single rotation.

In an example, assume that the BEMF is being monitored in each winding 120-1 through 120-6 of FIG. 1. If poles 130-1 through 130-6 were spaced symmetrically on stator 120 (i.e., each with angular separation of $\pi/3$ from the next), the time between successive BEMF pulses could be compared to $\tau_{Ref}/6$ to generate current in windings 120-1 through 120-6 to maintain the desired speed.

However, this method is inaccurate if poles 130-1 through 130-6 are not spaced symmetrically on stator 120. In an example, assume that rotor 140 is at the desired rotational speed. If the angular spacing between pole 130-1 and pole 130-2 is less than $\pi/3$, the measured time will be less than $\tau_{Ref}/6$, even though rotor 140 is at the correct angular speed. As a result, the spindle motor control will modify the current in the windings to decrease the speed of rotation. Similarly, if the angular spacing is greater than $\pi/3$, the spindle motor control will modify the current in the windings to increase the speed of rotation. Thus, asymmetry in the placement of the poles may prevent accurate speed control.

Other methods that may be used to control spindle motor speed include control systems that use embedded servo sectors to sample the speed more frequently. However, the accuracy of this method is dependent on writing the servo sectors at equally spaced intervals. In order to write the servo sectors with the desired accuracy, the initial spindle speed control needs to be sufficient.

The current inventors recognized that, at some point in the process of manufacturing and using a disc drive, the drive may have to be spun without any information written on the disc. In such circumstances, the only spindle speed feedback available is the BEMF of the motor windings. For a system having N windings and M permanent magnet poles in the rotor (e.g., M poles of permanent magnets 150 of FIG. 1), there are N*M BEMF signal attributes that may be used for spindle motor control. Typical BEMF signal attributes used for speed control are the zero crossings of the BEMF signals, although other signal attributes may be used.

Systems and techniques described herein may be used for accurate spindle motor control, even when no information is written on the disc. Information indicative of the placement of spindle motor components may be obtained and used to provide a correction to one or more BEMF-derived attributes used to control the spindle speed. Thus, asymmetry in the placement of the components may be "corrected out" of the BEMF signal.

Figure 2A:
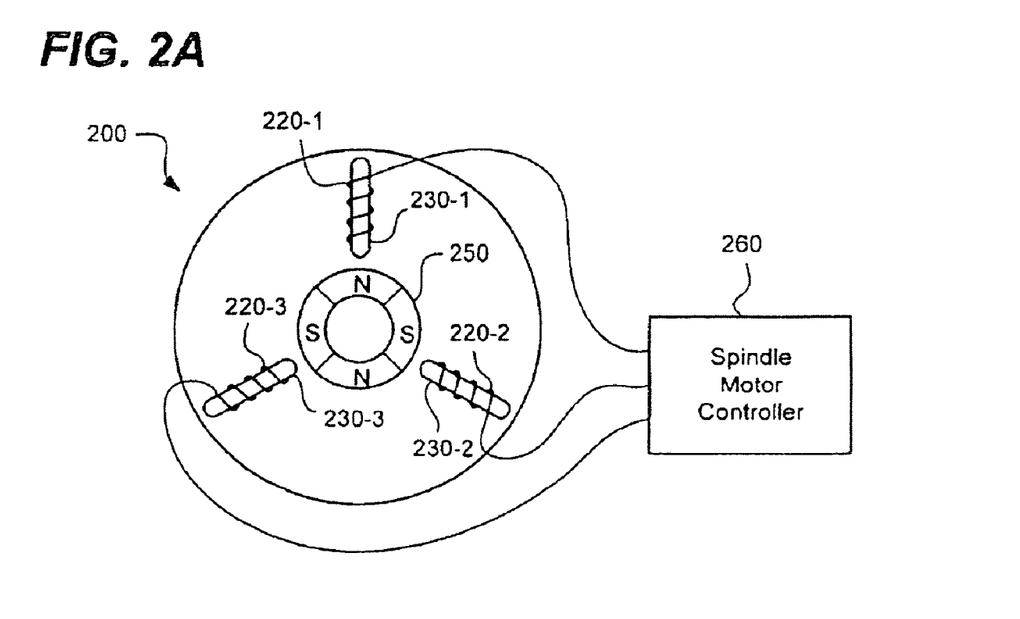
FIG. 2A is a schematic of a spindle motor with a spindle motor controller, according to some implementations.

FIG. 2A shows an asymmetric spindle motor including a spindle motor control system. For simplicity, FIG. 2A shows a system with three stator poles 220-1 to 220-3, three windings 230-1 to 230-3, and a rotor with two permanent magnets 250-1 and 250-2, with a total of four poles. In FIG. 2A, poles 220-1 and 220-3 are separated by $2\pi/3$, but pole 220-2 is closer to pole 220-1 than 220-3. Note that asymmetries in real systems are typically much smaller than the asymmetry of FIG. 2A.

Windings 230-1 through 230-3 are in communication with a spindle motor controller 260. Spindle motor controller 260 receives signals indicative of the BEMF in each of the windings, and also controls the voltage across the windings used to generate torque in system 200. Note that although controller 260 is shown as a single unit in FIG. 2A, its functionality may be implemented in multiple units. Further, controller functionality may be implemented at least partially using software.

Figure 2B:
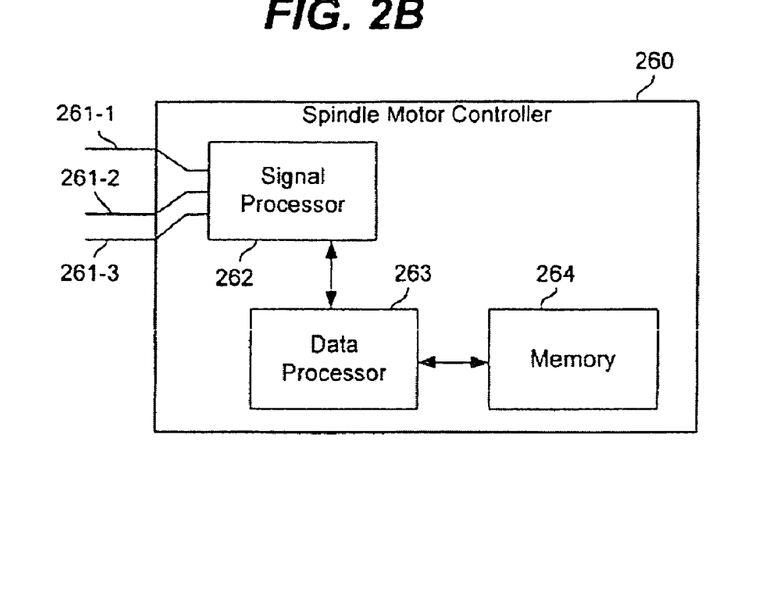
FIG. 2B illustrates an implementation of a spindle motor controller.

FIG. 2B shows an implementation of controller 260. Signals from vindings 230-1 to 230-3 may be received on inputs 261-1 to 261-3. The signals may be processed by a signal processor 262, which may subsequently provide signal-related data to a data processor 263. Data processor 263 may process signal-related data, and may also access additional data in a memory 264. Data processor 263 may then determine one or more parameters (such as correction factors) for controlling the spindle motor speed. The parameters may then be provided to signal processor 262, which may transmit associated output signals to windings 230-1 to 230-3 via inputs 261-1 to 261-3 or via one or more separate outputs.

Figure 3:
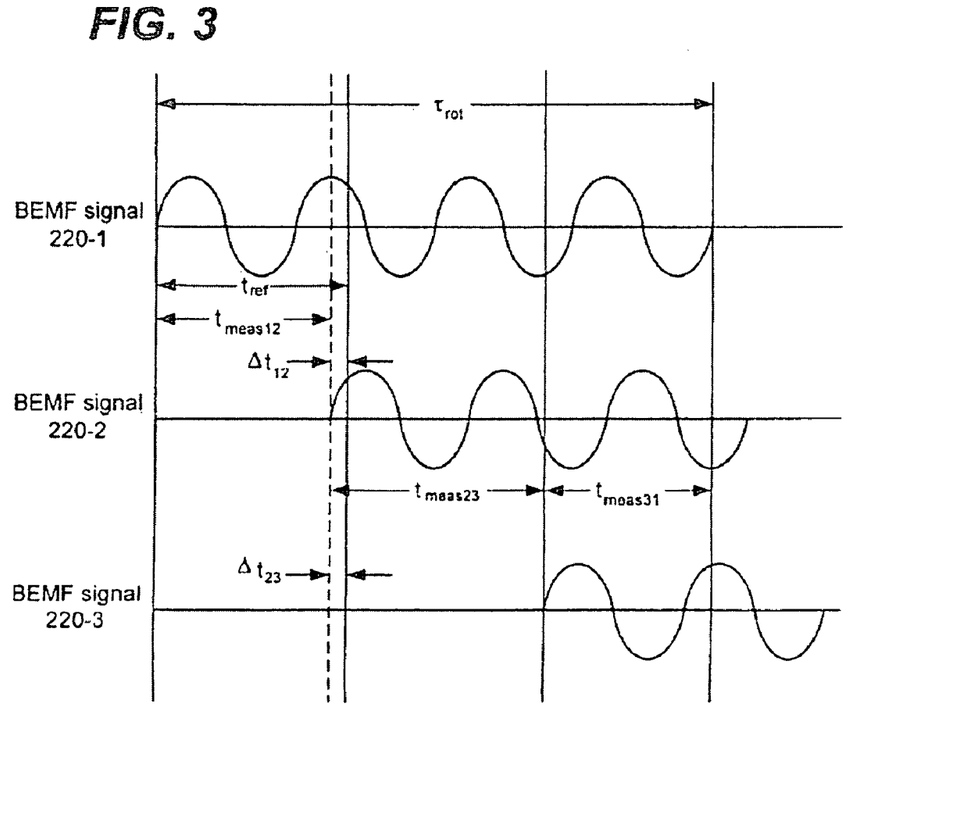
FIG. 3 is a graph of BEMF signals versus time that may be detected by a controller such as that shown in FIG. 2B.

FIG. 3 shows exemplary waveforms that may be received by controller 260 when the spindle motor is rotating at the desired spindle motor speed. For a particular desired spindle motor speed, a time equal to $\tau_{rot}$ is required for a complete rotation of rotor 260. During that time, there are eight zero crossings of the BEMF signal for winding 230-1.

If the poles were equally spaced, corresponding zero crossings for the three windings would be spaced by a time $\tau_{ref}$ equal to $\frac{1}{3} \tau_{rot}$. However, since pole 220-2 is closer to pole 220-1 than to pole 220-3, the measured time interval $t_{meas12}$ is smaller than $t_{ref}$ by an error amount $\Delta t_{12}$. Similarly, $t_{meas23}$ is larger than $t_{ref}$ by an error amount $|\Delta t_{23}|=|\Delta t_{12}|$. Since poles 220-3 and 220-1 are spaced correctly, $t_{meas31}$ is equal to $t_{ref}$, and the error amount $\Delta t_{23}=0$. As FIG. 3 illustrates, even when the rotational speed is equal to the desired speed, a non-zero error amount is measured due to the asymmetry in the system. However, if the error amounts corresponding to rotation at the desired speed can be determined, they may be used as correction factors to "subtract out" the asymmetry error.

Figure 4A:
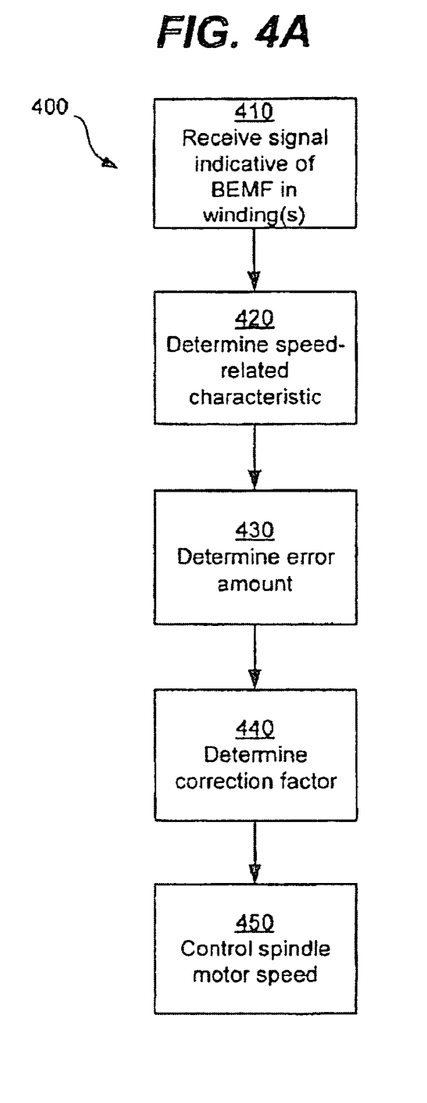
FIG. 4A shows a method of spindle motor control, according to some implementations.

FIG. 4A shows an implementation of a method that may be used to correct for asymmetry in components of the spindle motor. A signal indicative of a BEMF generated in one or more windings is received (410). A speed-related characteristic is determined based on the signal (420). An error amount is determined based on the speed-related characteristic and a reference amount (430). A correction factor for the speed-related characteristic is determined based on one or more error amounts (440). The spindle motor speed is controlled based on the correction factor and the speed related characteristic (450).

In some implementations, correction factors may be determined and used in combination with detected signals indicative of the BEMF in the windings to control the spindle motor speed, according to method 400 of FIG. 4A. The received signal indicative of a BEMF generated in one or more windings is the voltage across windings 220-1 through 220-3. The speed-related characteristics are the measured time differences between corresponding zero crossings in the different windings (e.g., $t_{meas12}$, $t_{meas23}$, and $t_{meas21}$). The time differences are compared to the time interval corresponding to the desired speed to determine the error amounts (e.g., $\Delta t_{12}$, $\Delta t_{23}$, and $\Delta t_{31}$). The error amounts may then be used to determine correction factors for the measured time differences to control spindle motor speed.

Figure 4B:
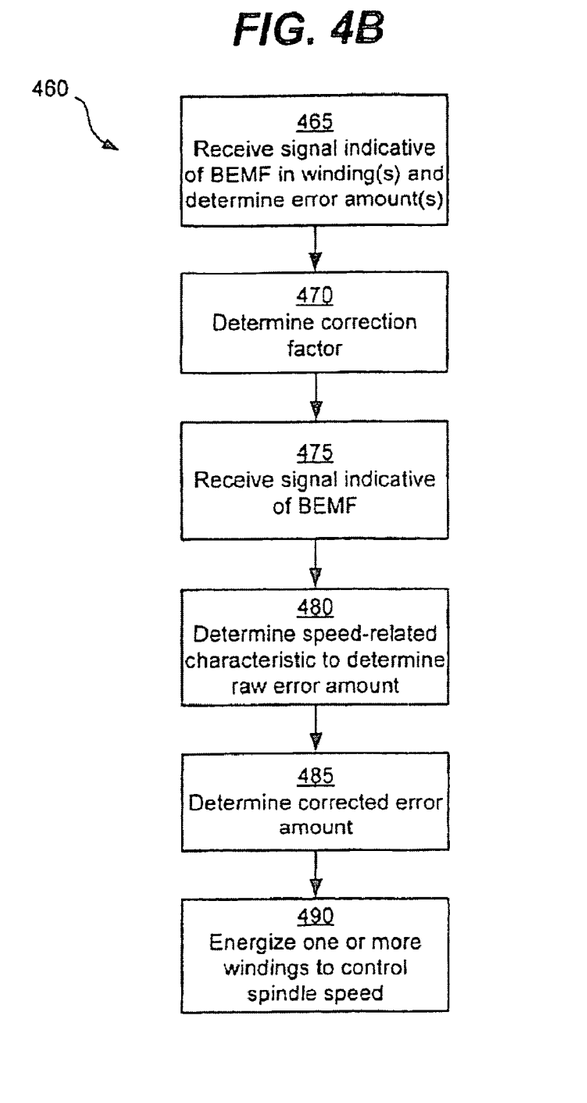
FIG. 4B shows another method of spindle motor control, according to some implementations.

FIG. 4B shows an implementation of a method 460, which more clearly illustrates how spindle motor speed may be controlled. A signal indicative of BEMF may be received and one or more error amounts determined (465). A correction factor may be determined (470). The correction factor may be determined based on the one or more error amounts. For example, error amounts may be measured for a number of revolutions of the spindle motor, then the error amounts may be processed to determine a correction factor. Determination of correction factors from error amounts is discussed more fully below.

Once a correction factor is determined, it may be used to control spindle motor speed. For example, a signal indicative of BEMF may be received (475). A speed-related characteristic may be determined based on the received signal to determine a raw error amount (480). A corrected error amount may then be determined by subtracting the correction factor from the raw error amount (485). One or more of the windings may then be energized to reduce the corrected error amount and provide a correction to the spindle speed (490).

Figure 5:
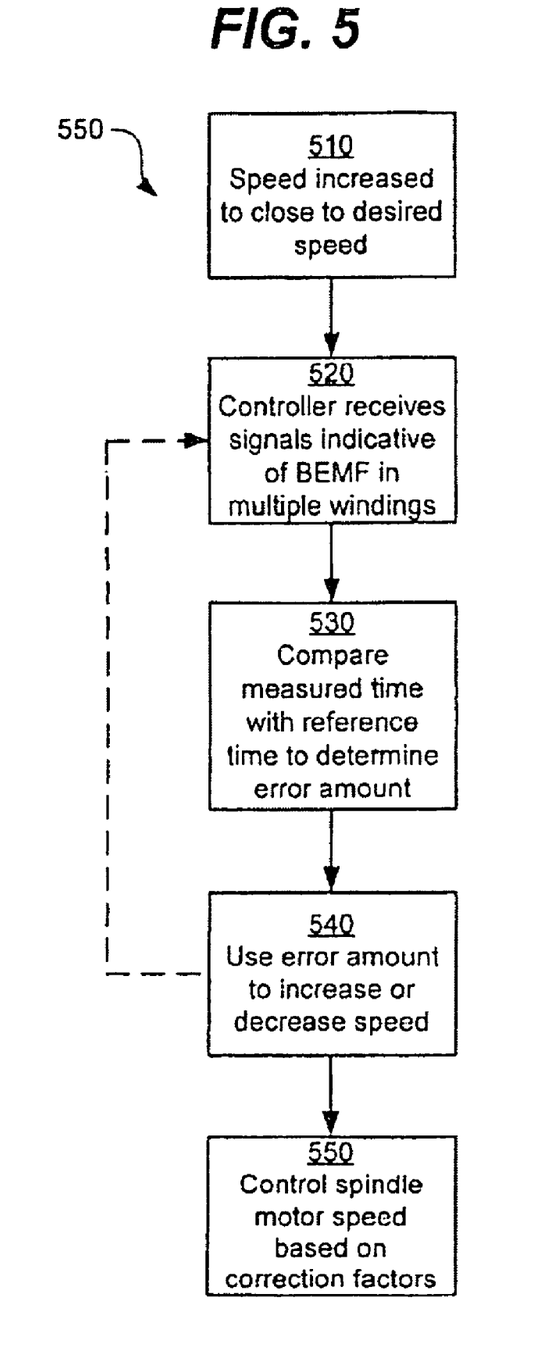
FIG. 5 shows another method of spindle motor control, according to some implementations.

Correction factors may be determined from the error amounts in a number of ways. For example, FIG. 5 shows a low gain mode that may be implemented when the disc drive is started up. In the low gain mode, the spindle motor may first be brought to a speed that is close to the desired speed (510). For example, the BEMF signal generated in a single winding over the course of a rotation of the rotor may be used to determine the approximate speed of the spindle motor, as described above.

The controller then receives signals of the BEMF generated in multiple windings (520) and determines error amounts by comparing measured times with one or more reference times (530). The controller uses the error amounts to increase or decrease the speed of the spindle motor (540). However, low gain feedback is used rather than the conventional high gain feedback. That is, rather than changing the spindle speed by the amount projected to reduce any of the error amounts to zero (which in a symmetric system would correspond to bringing the motor speed to the desired speed), the spindle speed is altered by a smaller amount.

The process may be iterated so that the spindle speed approaches the desired spindle speed more closely; however, in some implementations correction factors may be based on a single determination of one or more error amounts. One or more correction factors may be determined from the error amounts (550). For example, a correction factor for $t_{meas12}$ may be determined by taking the average of the values of $\Delta t_{12}$ over a number of revolutions of the spindle motor. Many other implementations are possible. For example, the error amount data may be filtered so that only some of the error amounts are used to determine the correction factors (e.g., the larger error amounts may be filtered and one or more of the smaller error amounts may be used to determine the associated correction factor).

Different attributes of the BEMF signals may be used to provide information for speed control. In one implementation, the spindle motor control loop may be a phase-locked loop (PLL). A timing feedback signal is phase-locked to a reference clock with the targeted interval spacing. The time difference between the spindle BEMF timing marks (e.g., the zero crossings of the BEMF signals for each of the windings) and the nearest reference clock edge thus represents the phase error of the spindle motor PLL. The phase error may be determined from a timing mark (such as a zero crossing of the BEMF signal) and a reference clock edge according to the relationship:

Phase_error=Timing_Mark−nearest_ref_clock_edge

The phase error can be used in a feedback system to control the spindle motor.

For every BEMF timing mark around one revolution (e.g., each of the N*M zero crossings), the phase error signal corresponding to the BEMF timing mark will have a generally non-zero mean value that is determined by the asymmetry of the spindle motor structure. A mean error can be characterized and tracked, then used to cancel out the systematic component in the phase error for each BEMF timing mark. A corrected phase error may then be calculated for each of the i=1 to N*M timing marks as follows:

Corrected_Phase_Error(i)=
 Phase Error(i)−mean_error(i)

The corrected phase error may then be used for spindle motor speed control.

As noted above, in some implementations, filtering may be used to improve performance. A mean_error(i) table may be calculated using some form of low pass filter on the instantaneous phase error value as follows:

Mean_error(i)=low_pass_filter(Phase_Error(i))

The low pass filter may be (for example) a comb filter, which uses an equally weighted average of N pass events, or filters that put more weight to most recent events (such as first order infinite impulse response (IIR) filters).

In some implementations, a frequency locked loop may be used for spindle motor control. The timing error may be measured as:

Timing_error(i)=BEMF_interval(i)−ideal_interval

The corrected timing error is then:

Corrected_Timing_Error(i)=
 Timinu_Error(i)−mean_interval_error(i)

A filter may be used to filter timing data. For example, a low pass filter may be used to filter the timing error values as follows:

Mean_interval_error(i)=LPF(Timing_Error(i))

In some implementations, timing errors may be convolved with the gain of the loop or the spindle control system itself and correction factors determined using a more complex calculation. In such an implementation, the gain may be determined by injecting a disturbance into the system (e.g., injecting torque by energizing the stator windings) and measuring the response of the motor.

In some implementations, correction factors may be determined recursively, so that a method such as method 500 of FIG. 5 is used to determine a first set of correction factors, then repeated one or more times to produce a second, more accurate set of correction factors.

In some implementations, the above described systems and techniques may be used to control spindle speed in a system using timing marks from servo sectors. As noted above, there may be asymmetry in the location of servo sector wedges on the hard disc. By correcting the signals from the servo sectors using the above methods, errors due to asymmetry may be corrected.

The systems and techniques may also be used for an eccentrically mounted disc (e.g., a hard disc drive that has been subjected to a large lateral shock which causes the disc to slip, resulting in off-center disc rotation). The correction factors can compensate for the eccentricity.

In some implementations, the above described systems and techniques may be used as follows. A counter may be set up running on a stable reference clock for counting the position of feedback timing marks. The counter value may be recorded whenever a feedback timing mark is received. The recorded counter values then represent the timestamps of the feedback timing marks.

On first spin-up of the disc, a frequency lock algorithm may be enabled, where the algorithm calculates the difference between consecutive timestamps, then compares the time interval against the expected ideal time interval. If the measured interval is greater than the expected interval, the motor speed may be increased. If the measured interval is shorter than the expected time interval, the motor speed may be decreased.

Once approximate frequency lock has been achieved, either frequency lock or phase lock may be used for better speed control. For the frequency lock loop method, once approximate frequency lock has been achieved, the mean interval error table may be calculated and the loop iteratively stabilized further. If the phase lock method is desired, the mean interval error table need not be calculated.

To use the phase lock algorithm, upon detection of one of the feedback timing marks, the following variable is initialized to the timestamp value for the timing mark:

Expected_Timestamp=measured_timestamp

On subsequent timing marks, perform the following algorithm on the ith timing mark:

Expected_timestamp=Expected_Timestamp+expected
 time interval

Phase_Error[i]=
 measured_time_stamp−Expected_Timestamp

Corrected_Phase_error=Phase_Error[i]−mean_error[i]

Mean_error[i]=mean_error[i]*(1−a)+
 Phase_Error[i]*a

Here, a is a small number (e.g., 0.01), so that the last equation represents a first order low pass filter. The mean_error[ ] table may be initialized at the beginning of the algorithm. If no prior information is available, the table may be initialized to include zero values. Note that if Corrected_phase_error is greater than zero, the spindle speed is too slow, and the spindle speed should be increased. If the corrected_phase_error is less than zero, the spindle speed should be decreased.

Figure 6:
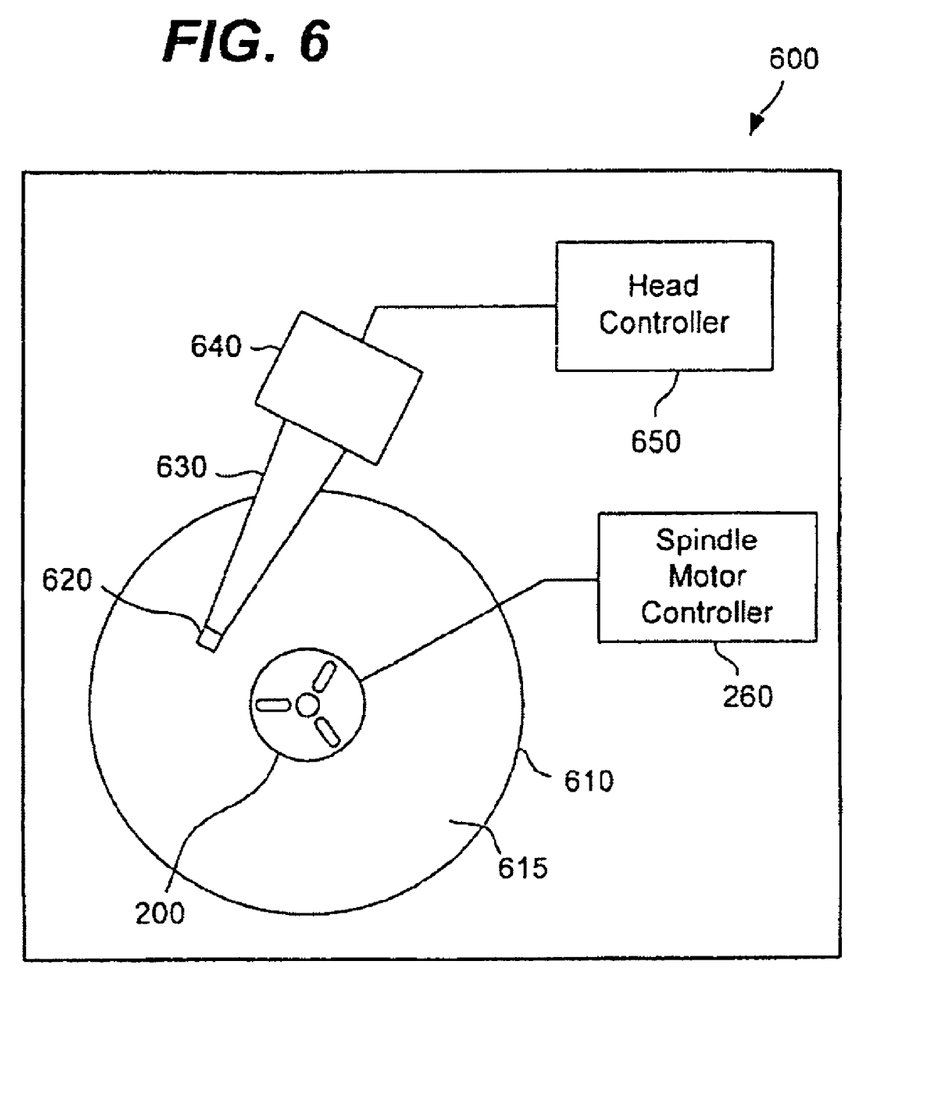
FIG. 6 is a schematic of a disc drive, according to some implementations.

As noted above, the systems and techniques for spindle motor control may be implemented in a storage system such as a disc drive. FIG. 6 shows a disc drive 600 including a spindle motor 200 for spinning one or more discs such as disc 610. Disc 610 has a storage surface 615 to store data using. For example, 615 may be include a magnetic material to store data magnetically. A spindle motor controller 260 may control the speed of rotation of spindle motor 200, as described above.

Data may be read from and/or written to storage surface 615 of disc 610 using a head 620. In FIG. 6, a single read/write head is illustrated; however, in some implementations separate heads may be used for reading data from and writing data to disc 610. Head 620 is located at the end of an actuator arm 630, and positioned on surface 615 via an actuator drive 640 in communication with a head controller 650. Note that many other disc drive implementations are possible.

A number of implementations have been described. Nevertheless, it will be understood that various modifications may be made without departing from the spirit and scope of the invention. For example, different types and numbers of pole/winding systems may be used. Although implementations using disc drive systems are described, the systems and techniques may be used with other data storage systems incorporating motors. Accordingly, other implementations are within the scope of the following claims.

What is claimed is:

1. A method comprising:
   receiving timing information associated with a first stator winding and a second stator winding of a spindle motor, the timing information being generated based on a rotational speed of the spindle motor;
   determining position information including physical positions of the first and second windings relative to each other;
   comparing the received timing information with reference information; and
   adjusting the rotational speed of the spindle motor based on the comparison and the position information.

2. The method of claim 1, where receiving timing information includes receiving information indicative of zero crossings associated with the first stator winding and the second stator winding,
   where comparing the received timing information includes identifying a time difference between the zero crossings and the reference information.

3. The method of claim 1, further comprising:
   receiving the reference information including reference timing information,
   where comparing the received timing information includes determining a time difference between the received timing information and the reference timing information.

4. The method of claim 3, where the reference timing information corresponds to a target speed of the spindle motor.

5. The method of claim 4, where adjusting the rotational speed includes adjusting the rotational speed based on the time difference to match the target speed of the spindle motor.

6. The method of claim 1, where comparing the received timing information includes identifying one or more timing errors between the received timing information and the reference information.

7. The method of claim 6, where adjusting the rotational speed includes:
   determining a correction factor based on the one or more identified timing errors; and
   adjusting the rotational speed based on the correction factor.

8. The method of claim 7, where:
   identifying one or more timing errors includes:
      measuring the one or more timing errors over one or more revolutions of the spindle motor; and
      averaging the one or more measured timing errors to generate an average error; and
   determining the correction factor includes determining the correction factor based on the average error.

9. The method of claim 6, further comprising filtering the one or more identified timing errors to generate one or more filtered timing errors,
   where adjusting the rotational speed includes adjusting the rotational speed based on the one or more filtered timing errors.

10. The method of claim 1, further comprising:
    receiving the reference information including receiving a reference clock,
    where comparing the received timing information includes determining a phase error indicative of a time difference between the received timing information and the reference clock.

11. The method of claim 10, further comprising:
    determining a non-zero mean value associated with a phase error; and
    determining a corrected phase error based on the non-zero mean value and the phase error,
    where adjusting the rotational speed includes adjusting the rotational speed based on the corrected phase error.

12. The method of claim 1, where receiving timing information includes:
    receiving a first signal indicative of a first back electromotive force (BEMF) induced in the first stator winding;
    receiving a second signal indicative of a second BEMF induced in the second stator winding; and
    identifying a spacing interval between the first stator winding and the second stator winding based on the first signal and the second signal.

13. The method of claim 12, further comprising:
    receiving the reference information indicative of a target spacing interval,
    where comparing the received timing information includes determining a timing error based on the identified spacing interval and the target spacing interval.

14. The method of claim 13, further comprising:
    filtering the timing error; and
    determining a corrected timing error based on the determined timing error and the filtered timing error.

15. The method of claim 1, where receiving timing information includes:
    identifying a first timing mark associated with the first stator winding including time-stamping the first timing mark;
    identifying a second timing mark associated with the second stator winding including time-stamping the second timing mark; and
    determining a time interval based on the first time-stamped timing mark and the second time-stamped timing mark.

16. The method of claim 15, where comparing the received timing information includes comparing the time interval with a target time interval; and
where adjusting the rotational speed includes:
increasing the rotational speed if the time interval is longer than the target interval; and
decreasing the rotational speed if the time interval is shorter than the target interval.

17. A spindle motor controller comprising:
one or more inputs configured to receive timing information from a spindle motor, the timing information including timing information associated with a first stator winding and a second stator winding of the spindle motor, the timing information being generated based on a rotational speed of the spindle motor; and
a module configured to:
determine position information including physical positions of the first and second windings relative to each other;
compare the received timing information with reference information; and
adjust the rotational speed of the spindle motor based on the comparison and the position information.

18. The controller of claim 17, where the timing information includes information indicative of zero crossings associated with the first stator winding and the second stator winding,
where the processor compares the received timing information by identifying a time difference between the zero crossings and the reference information.

19. The controller of claim 17, where the module includes one or more circuits configured to determine the position information, compare the received timing information and adjust the rotational speed of the spindle motor.

20. The controller of claim 17, where the module includes a processor executing software instructions to determine the position information, compare the received timing information and adjust the rotational speed of the spindle motor.

* * * * *